United States Patent [19]

Finelli et al.

[11] 4,086,606

[45] Apr. 25, 1978

[54] STROBE CAMERA WITH FLAT CAPACITOR

[75] Inventors: Patrick L. Finelli, Sudbury; Richard Paglia, Carlisle, both of Mass.

[73] Assignee: Polaroid Corporation, Cambridge, Mass.

[21] Appl. No.: 733,768

[22] Filed: Oct. 19, 1976

[51] Int. Cl.² .......................................... G03B 17/02
[52] U.S. Cl. ..................................... 354/288; 354/126
[58] Field of Search ................. 354/126, 145, 288, 150

[56] References Cited

U.S. PATENT DOCUMENTS

| | | | |
|---|---|---|---|
| 3,524,393 | 8/1970 | Greger | 354/288 |
| 3,528,352 | 9/1970 | Ikegami | 354/126 X |
| 3,577,899 | 5/1971 | Ikegami | 354/126 |

*Primary Examiner*—John Gonzales
*Attorney, Agent, or Firm*—Edward S. Roman

[57] ABSTRACT

A photographic camera having an integral flash unit therein is further configured to accommodate the ready removal and insertion of a substantially flat, thin storage capacitor from a location immediately inside one planar wall section of the camera. Upon receipt of the storage capacitor, the camera is further arranged to provide structure which operates to restrain a widthwise expansion of the capacitor which might otherwise tend to occur with extended usage of the capacitor without initially imposing any compressive forces on the capacitor which might otherwise tend to alter the electrical characteristics thereof.

21 Claims, 7 Drawing Figures

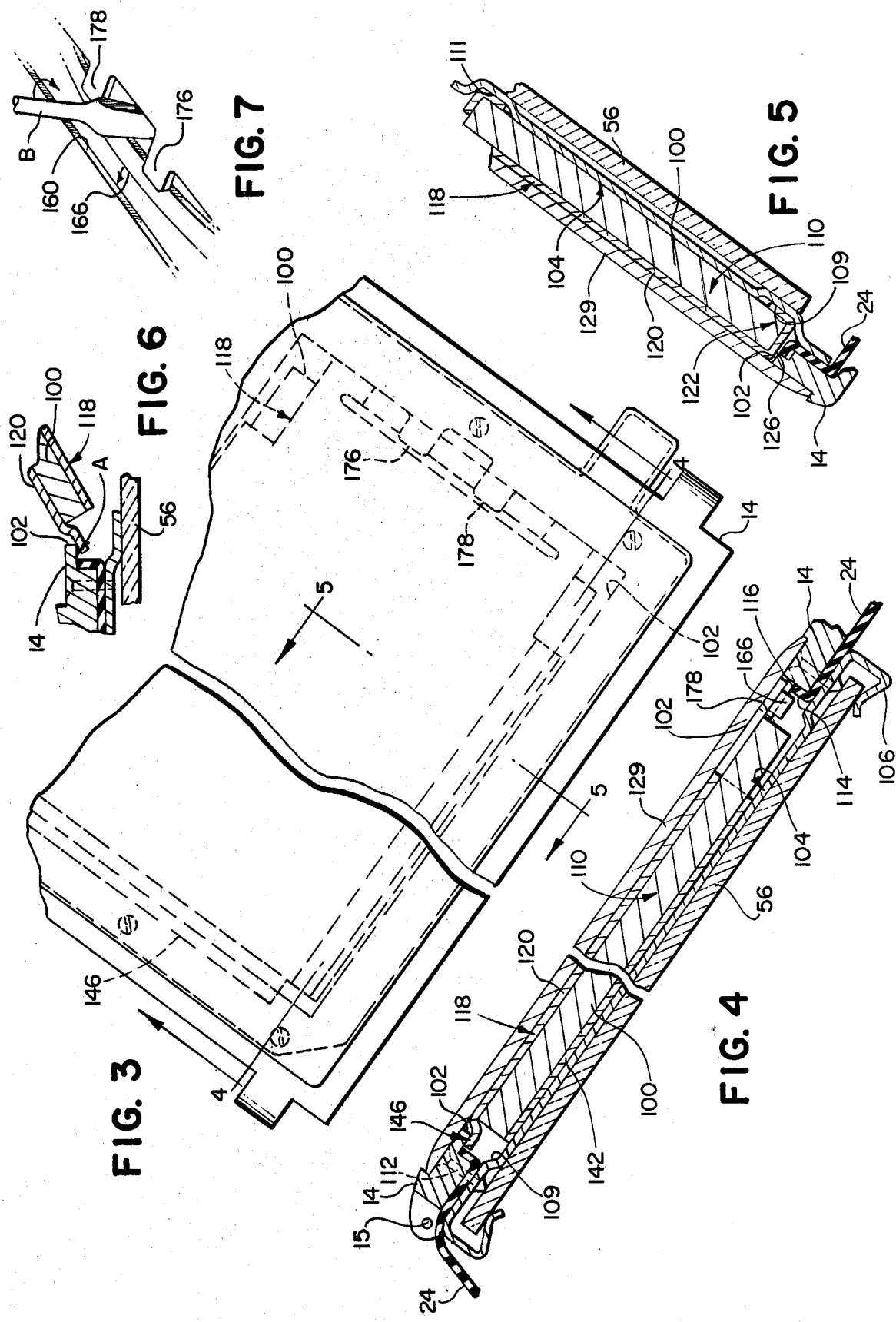

STROBE CAMERA WITH FLAT CAPACITOR

BACKGROUND OF THE INVENTION

1. Field of the Invention

This invention relates generally to a strobe camera with a flat capacitor mounting arrangement and, more particularly, to a strobe camera wherein a substantially flat strobe capacitor is releasably mounted adjacent one planar wall section of the camera in a manner restraining widthwise expansion of the capacitor which might otherwise occur during extended usage of the capacitor without initially imposing any compressive forces on the capacitor which might tend to alter the electrical characteristics thereof.

2. Description of the Prior Art

It is well known in the photographic art to utilize an electronic flash or stroboscopic source of artificial illumination when photographing under conditions of low ambient scene light intensity and to build the strobe or electronic flash into the camera. For such a high speed photographic lighting system, it has generally been required to provide a large cylindrical electrolytic storage capacitor having large capacity. However, such a large capacitor together with the other strobe circuit components is impossible to incorporate as a unit within the camera body without incurring both a substantial increase in the weight and appearance of the resulting camera.

In order to overcome this difficulty, it has been recently suggested to provide a high speed lighting system of the electronic flash type which is built into the camera by making the storage capacitor of such flat thin configuration and dimension that it may be readily mounted in back of the camera or within the camera case. Such arrangements are more fully shown and described in U.S. Pat. No. 3,577,899 entitled "Flash System for a Photographic Camera" issued May 11, 1971; and U.S. Pat. No. 3,528,352 entitled "Camera with Detachable Speed Light Power Source" issued Sept. 15, 1970. The arrangements of the aforementioned patents are achieved principally by making the storage capacitor thin in form and built into the camera case or the back cover of the camera.

Thin, flat electrolytic storage capacitors of the above-described type may be subject to both deterioration and expansion with time, which effects should be anticipated in any arrangement for building a capacitor into the camera case. Thus, provision must be made for accommodating ready insertion and withdrawal of the capacitor from the camera case in the event that the capacitor should deteriorate to the point of failure. In addition, provision must also be made for restraining the capacitor from any widthwise expansion which might tend to occur with time while also being careful not to impose any initial compressive forces on the capacitor which might tend to change its electrical characteristics.

Therefore, it is a primary object of this invention to provide camara apparatus having an integral strobe unit built therein wherein the storage capacitor for the strobe is of a thin, flat configuration and there is provided means for stowing the storage capacitor adjacent the inside of a planar wall section of the camera in a manner accommodating ready insertion and withdrawal of the capacitor from the camera.

It is a further object of this invention to provide an arrangement for stowing a thin, flat storage capacitor within a camera of the type having an integral strobe unit associated therewith wherein the capacitor is restrained from widthwise expansion which might otherwise tend to occur with extended usage while having no initial compressive forces imposed thereon which might otherwise tend to alter its electrical characteristics.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

A photographic camera adapted for use with an electronic flashtube includes a substantially thin, flat capacitor for selectively energizing the flashtube. The camera includes at least one substantially planar housing section having an opening therein of sufficient dimension to accommodate therewithin a major surface of the capacitor to facilitate the removable insertion of the capacitor through the opening. There is also provided a capacitor mounting member having a substantially flat and rigid wall section together with means for removably receiving the capacitor in a manner whereby a major external surface of the capacitor is disposed immediately adjacent to a wall section. The mounting member is also configured to be slidably inserted into the opening while the capacitor is disposed thereon. The mounting member also includes means for cooperating with other structure of the camera to removably latch the mounting member to the camera when it is inserted through the opening. A substantially planar wall member is disposed in immediate coplanar adjacency to at least the major portion of the other major external surface of the capacitor for cooperation with the wall section of the mounting member to restrain widthwise expansion of the capacitor tending to occur during extended usage of the capacitor without initially imposing any compressive forces on the capacitor which might tend to alter the electrical characteristics thereof.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

FIG. 3 is a fragmented plan view of one planar section of the camera of FIG. 1;

FIG. 4 is a cross-sectional view taken across the line 4—4 of FIG. 3;

FIG. 5 is a cross-sectional view taken across the line 5—5 of FIG. 3;

FIG. 6 is an enlarged cross-sectional view showing a portion of the camera of FIG. 1 in a different mode of operation; and FIG. 7 is a perspective view of a portion of the photographic apparatus of FIG. 1 shown in a different mode of operation.

DESCRIPTION OF THE PREFERRED EMBODIMENT

Figure 1:
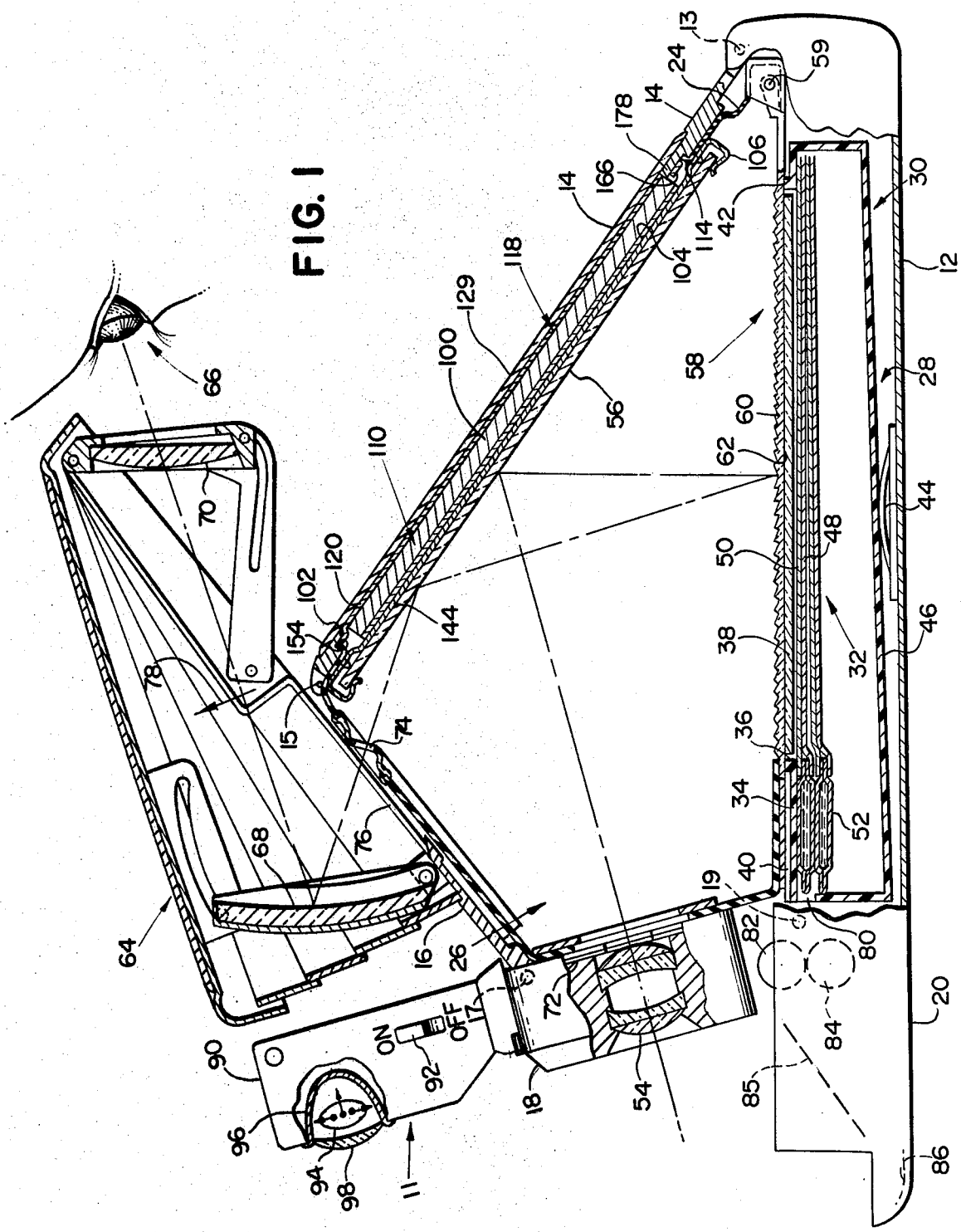
FIG. 1 is a cross-sectional view of the photographic camera of this invention.

Referring now to FIG. 1 there is shown a compact, folding, single lens reflex camera 10 of the self-developing type provided with a strobe unit generally designated 11. The camera 10 is shown in its extended operative position that maybe folded to a compact position as will become apparent in the following discussion and as is well known in the art. Camera 10 includes a variable geometry housing formed by 5 rigid housing sections or members 12, 14, 16 and 18 which are pivotally interconnected at pivot points 13, 15, 17 and 19 to form a movable four-bar linkage, with section 20 pivotally coupled to one end of housing section 12.

The four-bar linkage structure permits the geometry of the housing to be converted from a folded inoperative configuration (not shown) to the extended operative configuration by rotating housing section 14 in a clockwise direction about pivot point 13 (as viewed in FIG. 1) until an erecting link (not shown) coupled between sections 12 and 14 automatically locks to releasably secure the camera in the extended position. Secured to the interior surfaces of housing sections 12, 14 and 18 is a foldable, opaque, envelope or bellows 24 which is automatically unfolded in response to moving the variable geometry housing to the extended position and cooperates with sections 12, 14, 16 and 18 to provide a lighttight exposure chamber 26 within the bounds of the four-bar linkage. For additional information regarding the bellows 24, reference may be made to U.S. Pat. No. 3,842,430 entitled "Folding Camera With Low Cost Bellows" issued Oct. 15, 1974.

The first housing section 12 includes a chamber 28 for receiving a film container 30 preloaded with a plurality of film units 32 arranged in stacked relation therein. Access for loading film container 30 into receiving chamber 28 is provided by rotating housing section 20 downwardly in a counterclockwise direction (as viewed in FIG. 1) to expose an open end of chamber 28 located near the interface between housing sections 12 and 20.

Film container 30 includes a forward wall 34 having an upstanding rib 36 which defines the bounds of a generally rectangular light-transmitting section or aperture 38 through which actinic radiation is adapted to pass to expose the forwardmost film unit 32. Film container 30 is supported within chamber 28, at its forward wall 34, by a plate-like support frame 40 having a rectangular opening 42 therein providing communication with the exposure aperture 38 of the film container 30. The forward wall 34 of the film container is securely held against support frame 40 by means of a support spring 44 secured to the interior surface of the bottom wall of the housing section 12 and adapted to engage a rear wall 46 of the film container.

Film unit 32 preferably is an integral unit comprising a plurality of superposed layers (including photosensitive and image-receiving layers) and a supply of fluid processing composition that is adapted to be distributed, subsequent to exposure, between a predetermined pair of layers to initiate a development and diffusion transfer process. The film unit 32 is diagrammatically illustrated as including upper and lower superposed elements 48 and 50 and a rupturable container 52 at one end of elements 48 and 50 holding the supply of fluid processing composition. It will be understood that the interface between the elements 48 and 50 is meant to represent the interface between a predetermined pair of layers in film unit 32. A more detailed description of film unit 32 may be found in U.S. Pat. No. 3,415,644 issued to E. H. Land on Dec. 10, 1968.

The camera's optical system includes an objective lens 54, mounted in the lens support and shutter housing 18, for forming an image of the scene to be photographed; a planar mirror 56, coupled to a member 104 configured to retain the mirror 56, for reflecting light passing through objective lens 54 towards the exposure plane; and a platelike reflex member 58, pivotally coupled to housing 12 at pivot 59 for movement between a viewing and focusing position, shown in FIG. 1, and an exposure position adjacent to and parallel with the fixed planar mirror 56. Reflex member 58 has a viewing surface or focusing screen 60 on one side for displaying the image formed by objective lens 54 via reflection from planar mirror 56, and a planar reflective surface 62 on the other side, the function of which will be described hereinafter.

The optical system further includes a foldable viewing device 64 for viewing the image displayed on focusing screen 60 from an eye station 66. The optical portion of viewing device 64 is formed by a curved mirror 68, an eye lens 70 and an entrance pupil or aperture 74 formed in bellows 24.

Camera 10, being of the single lens reflex type, is configured to operate first in a viewing and focusing mode of operation and thereafter in an exposure and processing mode. As best seen in FIG. 1, during the viewing and focusing mode of operation, reflex member 58 rests atop support frame 40 and light-seals opening 42 and the film container exposure aperture 38. A normally open shutter 72, mounted between objective lens 54 and an opening in bellows 24, permits light to pass through the lens 54 and across chamber 26 until it impinges upon mirror 56 which is positioned by housing section 14 in a manner to be subsequently described to reflect the light onto the focusing screen 60 to form an image of the scene to be photographed. Focusing screen 60 may take the form of an echelon type mirror as diagrammatically illustrated in FIG. 1. Light eminating from the image on focusing screen 60 is reflected upwardly toward planar mirror 56 from which it is reflected toward housing section 16. The light then passes through the small aperture 74 in bellows 24 which defines the entrance pupil for the viewing device 64 and then through a larger aperture 76 in housing section 16 until it impinges upon curved mirror 68. Mirror 68 has a concave ellipsoidal shaped reflective surface which reflects the light rearwardly toward eye station 66 and forms a real, erect, and unreverted aerial image designated by a vertical arrow 78. The eye lens 70 serves to magnify the image at 78 to facilitate viewing and focusing from the eye station 66.

In operation, the photographer views the aerial image 78 through eye lens 70 while adjusting objective lens 54 until it is in sharp focus. Once the image is in sharp focus, the photographer actuates a shutter release button (not shown) on housing section 18 which is operative to initiate the following sequence of operations. First, the normally opened shutter 72 closes and reflex member 58 is pivoted upwardly about pivot 59 to the exposure position adjacent to and parallel with the fixed mirror 56. A blocking member (not shown) attached to the movable end of reflex member 58 blocks the entrance pupil 74 of viewing device 64 thereby causing exposure chamber 26 to assume a lighttight condition.

Shutter 72 is then opened to admit light into exposure chamber 26. The light is reflected from the planar reflecting surface 62 on the underside of reflex member 58 onto the forwardmost film unit 32 thereby causing exposure of the film unit. After an appropriate exposure interval, the shutter again closes and reflex member 58 is pivoted downwardly to its viewing and focusing position. Once reflex member 58 caps opening 42 and the exposure aperture 38 in the forward wall 34 of the film container, shutter 72 is opened and the optical system assumes its viewing and focusing mode.

As reflex member 58 is being returned to its viewing and focusing position, the exposed forwardmost film unit is automatically advanced, by means not shown, forwardly through a withdrawal slot 80 in the leading end wall of film container 30 and into engagement with a pair of pressure applying rollers 82 and 84 mounted in housing section 20. Rollers 82 and 84 are adapted to be rotatably driven (by a camera mounted motor and drive train, not shown) in a direction to advance the exposed film unit 32 therebetween toward the exterior of camera 10. As the exposed film unit passes between rollers 82 and 84, and rollers apply compressive pressure to the film unit which causes pod 52 to rupture and dispense and processing fluid which is then uniformly distributed between the predetermined pair of layers to initiate the diffusion transfer process. A light shield 85, in front of the rollers, deflects the film unit downward and it exits from the camera through an opening 86 in the bottom wall of camera housing 20.

The preceding has been a brief description of the structure and operation of the folding reflex camera 10 to provide the necessary background for the following description of the novel arrangement for stowing an electrical storage capacitor as may be utilized in conjunction with the strobe unit 11 now to be described.

The strobe unit 11 provides light for the exposure of film units 32 in the film cassette 30 during a photographic exposure interval as is well known in the art. The strobe unit 11 comprises a housing 90 of any suitable conventional material, such as plastic or the like, which is formed integrally with the upper portion of the housing section 18. An ON-OFF switch 92 may be mounted on the housing 90. A flash tube 94 which may be a grid-controlled gas discharge tube of the conventional variety, is mounted in a reflector 96 secured to the housing 90. A lens 98 over the reflector 96 protects the gas tube 94 from external damage, and cooperates with the reflector to direct light into the solid angle seen by the camera lens.

In order to provide for as compact a strobe housing 90 as is possible, the storage capacitor for energizing the flash tube to cause it to emit light energy is configured to be substantially thin and flat as shown at 100. The arrangement of this invention provides for a compact thin cavity 110 for retaining the storage capacitor 100 in a manner whereby one of the capacitor's major external surfaces is disposed in immediate coplanar adjacency with respect to the plane of housing section 14. There are also included means for accommodating the ready insertion and withdrawal of the storage capacitor 100 from its cavity. Thus, by stationing the storage capacitor 100 adjacent to the plane of housing section 14 and behind the planar mirror 56 in the manner of this invention, there may be achieved a substantial reduction in the size of the strobe housing 90.

Housing section 14 comprises a substantially flat planar outside wall member through which there is provided a generally rectangular opening 102 of sufficient dimension to accommodate therewithin a major surface of the capacitor 100 to facilitate the removable insertion of the capacitor through the opening 102. A thin, flat planar outside cosmetic cover 129 is releasably stuck over the housing section 14 and its associated opening 102. During the insertion or withdrawal of the capacitor 100 from the camera in the manner to be herein described, it will be assumed that the cover 129 is removed from the camera in a manner as is well known in the art. A member configured to retain the mirror 56 comprises a substantially flat planar interior wall member 104 fixedly stationed inward of and generally parallel to the housing section 14 so as to underlie the generally rectangular opening 102 thereby defining the inward limit of the cavity 110. The mirror retaining wall member 104 may be provided with a plurality of resilient C type clips 106 disposed about the periphery thereof so as to overlap the periphery of the mirror 56 and retain it in substantial juxtaposition with respect to the member 104. The mirrir retaining wall member 104 includes two substantially parallel recessed channels 109, 111, the purpose of which will become apparent from the following discussion.

Sandwiched between the mirror retaining wall member 104 and the housing section 14 there can be seen the bellows 24 which is also provided with a generally rectangular opening 114 in general registration with the opening 102 in housing section 14. Around the opening 114 in bellows 24, there is provided an upstanding peripheral ridge 116 which facilitates the alignment of the bellows opening 114 with the housing section opening 102 and also operates in cooperation with complementary edges around the housing section opening 102 to provide a labyrinth type light seal. Means are provided for fixedly connecting the mirror retaining wall member 104 to the housing section 14 so that the mirror 56 is disposed in optical alignment with the objective lens 54 to redirect image carrying light rays entering the camera through the lens 54 onto the film plane. Such connecting means may simply comprise a plurality of spaced apart screws 112 disposed around the opening 102 and threadably engaged to complementary holes in the mirror retaining wall member 104.

Figure 2:
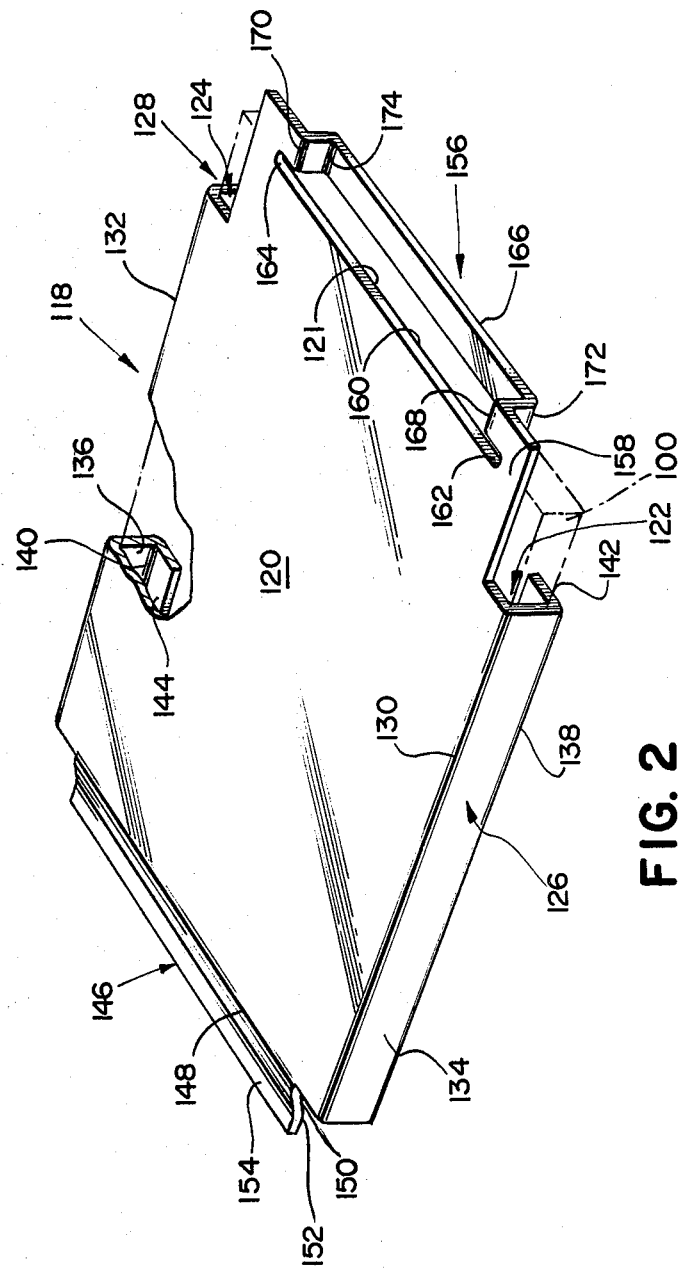
FIG. 2 is a perspective view of a removable portion of the camera of FIG. 1.

Referring now to FIG. 2 there is shown a capacitor mounting member as designated generally at 118 comprising a substantially flat rigid wall section 120 having a flat planar, generally rectangular, underlying major surface 121 from which depend two spaced apart, substantially parallel tracks as shown generally at 122 and 124. Tracks 122, 124 are respectively defined by elongated flange portions 126, 128 extending outwardly from opposed parallel sides of the wall section 120. The flange portions 126, 128 are respectively folded once longitudinally along the fold lines 130, 132 at the edge of the wall section 120 so as to define portions thereof 134, 136 which extend downwardly in general perpendicular alignment to the underlying major surface 121 of the wall section 120. The outward portions of the flanges 126, 128 are respectively folded longitudinally again along the fold lines 138, 140 so as to provide inwardly extending portions 142, 144 in spaced apart overlapping relation with respect to the underlying major surface 121 of the wall section 120. Tracks 122, 124 provide means for removably receiving the capacitor 100 in a manner whereby the tracks respectively accommodate sliding receipt with the opposed parallel edges of the capacitor 100. When capacitor 100 is inserted laterally into engagement with the tracks 122, 124, one major external surface of the capacitor will be disposed immediately adjacent the underlying major surface 121 of the wall section 120.

One edge of the wall section 120 transverse to the tracks 122, 124 includes an elongated recessed integral lip 146 projecting outwardly therefrom to operate in the manner of a hinge as will be hereinafter described in greater detail. Lip 146 is longitudinally folded downwardly along the fold line 148 about the edge of the wall section 120 so as to provide a portion 150 of the lip which extends perpendicularly downward from the underlying major surface 121 of the wall section 120. The lip 146 is longitudinally folded about a second fold line 152 so as to provide a portion 154 which extends outwardly in recessed substantially parallel relation with respect to the underlying surface 121 of the wall section 120.

A releasable latch portion as shown generally at 156 is provided adjacent the other edge of the wall section 120 opposite from the recessed lip 146 for cooperation with other structure of the camera to be hereinafter described to facilitate releasable connection of the wall section to the camera when the wall section is inserted in the opening 102. The releasable latch 156 includes an elongated flange 158 extending outwardly from the wall section 120 and cut along a portion of the length thereof as shown at 160. The cut 160 extends in general spaced apart, parallel, relation to the outside longitudinal edge of the flange 158 with the extreme ends of the cut as shown at 162 and 164 being spaced respectively inward from the ends of the flange 158. That portion of the flange 158 between the cut 160 and the outside longitudinal edge thereof as shown at 166 is recessed with respect to the underlying major surface 121 of the wall section 120 in like manner to the lip 146. The flange portion 166 is also resiliently deflectable at a direction substantially parallel to the wall section 120 for reasons of which will be more fully discussed in the following paragraph.

As is now readily apparent, the flange portion 166 is recessed with respect to the major surface 121 of the wall section 120 by first folding the outward portion thereof perpendicularly downward of the wall section 120 about the respective fold lines 168 and 170. The ends of the flange portion 160 are thereafter again folded perpendicularly about the fold lines 172 and 174 so as to recess the major portion of the flange 166. The capacitor mounting member 118 may be formed from sheet metal by cutting, stamping and folding in the above described manner.

Referring now to FIG. 3, the other structure of the camera which cooperates with the releasably latch portion can be seen to comprise two spaced apart dog ear projections 176 and 178 which extend laterally outward from the edge of the opening 102 for engagement with the overlying surface of the flange portion 166 in a manner that will now be more fully discussed.

Insertion of a storage capacitor within the receiving chamber 110 is accomplished in the following manner. First, a storage capacitor 100 is inserted into an empty capacitor mounting member 118 by laterally sliding the capacitor into the mounting member 118 in a manner whereby two opposed parallel edges of the capacitor are engaged respectively by the ends of the tracks 122, 124. Continued lateral movement of the capacitor 100 operates to slide the two opposed parallel edges thereof along the tracks 122, 124 so as to bring one major external surface of the capacitor into immediate coplanar adjacency to the underlying major surface 121 of the wall section 120 as shown by the phantom lines of FIG. 2. Next, with the cosmetic cover 129 removed to expose the opening 102, the user grasps the loaded capacitor mounting member 118 in a manner so as to bring the overlying surface of the recessed lip 146 into engagement with the underlying surface of the housing section 14 immediately adjacent that edge of the opening 102 opposite the dog ear projections 176, 178. As is now readily apparent, this may only be accomplished if the user physically intercepts the edge of the opening 102 with the lip 146 while the capacitor mounting member 118 is angled with respect to the plane of the housing section 14 as shown in FIG. 6. Thus, the user must thereafter pivot the loaded capacitor mounting member 118 about the elongated axis A defined by the line of engagement between the edge of the opening 102 and the lip 146 so as to rotate the releasable latch portion 156 into engagement with the dog ear projections 176 and 178. In order now to latch the capacitor mounting member 118 within the cavity 110 it is necessary to forceably deflect the flange portion 166 in a direction substantially parallel to the wall section 120 and toward the lip 146 in order to permit the flange portion 166 to pivot past the dog ear projections 176 and 178. This deflection may be accomplished by inserting an end of a screwdriver B into the opening between the flange 166 and the dog ear projections 176, 178, and thereafter twisting the screwdriver B in a manner effecting the aforementioned deflection of the flange portion 166. As is readily apparent, once the flange portion 166 is pivoted past the dog ear projections 176, 178 the screwdriver B may be removed to allow the flange portion 166 to spring back to its original position so as to underlie the dog ear projections 176 and 178. Thus, there is provided a releasable latch for retaining the capacitor mounting member 118 in the cavity. Latching the capacitor mounting member in the aforementioned manner also operates to pivot the tracks 122, 124 into respective engagement with the complementary recessed channels 109, 110 in the wall member 104. The channels 109, 110 are recessed only enough to accommodate the width of the overlapping flange portions 142, 144 thereby disposing the other major external wall surface of the capacitor in immediate coplanar adjacency to the non-recessed portion of the wall member 104. Thus, the underlying major surface 121 of the wall section 120 cooperates with the wall member 104 to restrain any widthwise expansion of the capacitor 100 tending to occur during extended usage of the capacitor without initially imposing any compressive forces on the capacitor tending to alter the electrical characteristics of the capacitor.

In order to replace the capacitor 100, the above described process may be reversed with the screwdriver B being first inserted between the dog ear projections 176, 178, and thereafter twisted to deflect the flange portion 166 to accommodate the outward pivoting of the capacitor mounting member 118. As is now readily apparent, the tracks 122, 124 operate to pivot capacitor 100 in correspondence with the mounting member 118 thereby facilitating easy withdrawal of the capacitor 100 from the cavity 110.

Thus, it can be seen that a compact arrangement for stowing a strobe storage capacitor can be provided adjacent a major surface of a camera housing wall section while at the same time accommodating ready withdrawal and insertion of the strobe capacitor. In addition, means are provided apart from the camera for releasably holding the strobe storage capacitor in order to better facilitate its ready insertion and withdrawal from the camera. The arrangement is easily adaptable to a current Polaroid SX-70 Land Camera without materially adding to the dimensions thereof and without disrupting the smooth planar contour of the outside housing sections. In addition the capacitor mounting member may be economically manufactured from a single stamping of thin sheet metal.

In addition to the above described advantages of easy insertion or withdrawal as well as compactness, there is provided a further advantage in sandwiching a flat substantially thin capacitor between two rigid planar wall members, i.e., wall member 104 and wall section 120, to impose dimensional stability to the flat capacitor and restrain any widthwise expansion of the capacitor which might otherwise occur during extended usage of the capacitor without initially imposing any compressive forces on the capacitor which might tend to alter the electrical characteristics of the capacitor.

Since certain changes maybe made in the above described system and apparatus without departing from the scope of the invention herein involved, it is intended that all matter contained in this description thereof, as shown in the accompanying drawings shall be interpreted as illustrated and not in a limiting sense.

What is claimed is:

1. A photographic camera adapted for use with an electronic flash tube and comprising:
    a substantially thin flat capacitor for selectively energizing the flash tube;
    a substantially planar housing section having an opening therein of sufficient dimension to accommodate therewithin a major surface of said capacitor to facilitate the removable insertion of said capacitor through said opening;
    a substantially planar wall section for selectively closing said opening when said capacitor is disposed inwardly of said opening with one of its major external surfaces disposed in immediate coplanar adjacency to said wall section; and
    means disposed in immediate coplanar adjacency to the other major external wall surface of said capacitor for cooperating with said planar wall section to restrain any widthwise expansion of said capacitor tending to occur during extended usage of said capacitor without initially imposing any compressive forces on said capacitor tending to alter the electrical characteristics of said capacitor wherein said capacitor is of a generally thin flat rectangular configuration and said wall section has a flat planar, generally rectangular, underlying major surface from which depend two spaced apart substantially parallel tracks disposed on the underside of said major surface of said wall section, said tracks respectively accommodating sliding receipt with two opposed parallel edges of said capacitor so as to retain said one major external surface of said capacitor in immediate coplanar adjacency to said rectangular major surface of said wall section.

2. The photographic camera of claim 1 wherein said restraining means includes a generally planar interior wall member in fixed, spaced apart, generally parallel relation with respect to said housing section, said interior wall member including two substantially parallel recessed channels complementary to said tracks, said recessed channels being operative to engagingly receive those portions of said tracks which extend outward of said other major wall surface of said capacitor to accommodate the disposition of said non-recessed portions of said interior wall member in immediate coplanar adjacency to said other major external wall surface of said capacitor.

3. The photographic camera of claim 1 wherein said tracks are defined respectively by elongated flange portions extending outwardly from opposed parallel sides of said wall sections with each of said flange portions being folded once longitudinally along the edge of said wall section so as to extend generally perpendicular to said major surface of said wall section with the outward portion of each flange being folded longitudinally again so as to extend inward in spaced apart overlapping relation with respect to said major surface of said wall section.

4. The photographic camera of claim 3 wherein said restraining means includes a generally planar interior wall member in fixed, spaced apart, generally parallel relation with respect to said housing section, said interior wall member including two substantially parallel recessed channels complementary to said outward overlapping portions of said flanges, said recessed channels being operative to engagingly receive said outward overlapping portions of said flanges to accommodate the disposition of said non-recessed portion of said interior wall member in immediate coplanar adjacency to said other major external wall surface of said capacitor.

5. A photographic camera adapted for use with an electronic flash tube and comprising:
    a substantially thin flat capacitor for selectively energizing the flash tube;
    a substantially planar housing section having an opening therein of sufficient dimension to accommodate therewithin a major surface of said capacitor to facilitate the removable insertion of said capacitor through said opening;
    a substantially planar wall section for selectively closing said opening when said capacitor is disposed inwardly of said opening with one of its major external surfaces disposed in immediate coplanar adjacency to said wall section; and
    means disposed in immediate coplanar adjacency to the other major external wall surface of said capacitor for cooperating with said planar wall section to restrain any widthwise expansion of said capacitor tending to occur during extended usage of said capacitor without initially imposing any compressive forces on said capacitor tending to alter the electrical characteristics of said capacitor wherein said housing section opening is generally rectangular and said wall section includes a flat planar generally rectangular major surface thereof from which depend means for releasably connecting the capacitor in immediate coplanar adjacency to said major surface of said wall section, there also being included a lip extending outward from one side of said wall section for longitudinal engagement with one underlying edge of said housing section opening to accommodate pivoting of said wall section about said underlying edge of said housing section opening, there additionally being included a releasable latch portion adjacent the other side of said major surface of said wall section opposite from said lip for cooperating with other structure of said camera to accommodate the latching of said wall section to said housing section when said wall section is pivoted into generally coplanar relation with said housing section.

6. The photographic camera of claim 5 wherein said releasable latch portion includes an elongated flange extending outwardly from said other side of said major surface of said wall section, said elongated flange being cut along a portion of the length thereof which cut is in general spaced apart parallel relation to the longitudinal edge of said flange with the extreme ends of said cut being spaced inward respectively from the ends of said flange, said flange portion between said cut and outside longitudinal edge being resiliently deflectable in a direction substantially parallel to said major surface of said wall section and wherein said other structure of said camera for cooperating with said latch portion includes at least one dog ear extending laterally outward from an edge of said housing section opening to overlap and engage said resiliently deflectable portion of said flange when said wall section is pivoted into generally coplanar relation with said housing section.

7. The photographic camera of claim 6 wherein said lip and deflectable flange portion are both recessed with respect to said major surface of said wall section.

8. A photographic camera adapted for use with an electronic flash tube and comprising:
a substantially thin flat capacitor for selectively energizing the flash tube;
a substantially planar housing section having an opening therein of sufficient dimension to accommodate therewithin a major surface of said capacitor to facilitate the removable insertion of said capacitor through said opening;
a substantially planar wall section for selectively closing said opening when said capacitor is disposed inwardly of said opening with one of its major external surfaces disposed in immediate coplanar adjacency to said wall section; and
means disposed in immediate coplanar adjacency to the other major external wall surface of said capacitor for cooperating with said planar wall section to restrain any widthwise expansion of said capacitor tending to occur during extended usage of said capacitor without intitially imposing any compressive forces on said capacitor tending to alter the electrical characteristics of said capacitor wherein said camera includes a lighttight bellows having an opening in substantial registration with respect to said housing section opening, said bellows opening being defined by an upstanding peripheral ridge with the area immediately adjacent said perpheral ridge being sandwiched between said housing section and said restraining means.

9. A photographic camera adapted for use with an electronic flash tube and comprising:
a housing member having an opening therein;
a substantially thin flat capacitor for selectively energizing the flash tube;
a capacitor mounting member including a substantially flat and rigid wall section and means for removably receiving said capacitor with a major external surface of said capacitor disposed immediately adjacent said wall section, said mounting member being configured to be pivotally inserted into said opening with said capacitor disposed thereon and further including means for cooperating with other structure of said camera to removably connect said mounting member thereto when it has been inserted through said opening; and
substantially planar means disposed in immediate coplanar adjacency to at least the major portion of the other major external surface of said capacitor for cooperating with said wall section of said mounting member to restrain widthwise expansion of said capacitor tending to occur during extended usage of said capacitor without initially imposing any compressive forces on said capacitor tending to alter the electrical characteristics of said capacitor.

10. The photographic apparatus of claim 9 wherein said capacitor is of a generally thin flat rectangular configuration and said wall section has a flat planar, generally rectangular, underlying major surface with said means for removably receiving said capacitor including two spaced apart substantially parallel tracks depending from the underside of said major surface of said wall section, said tracks respectively accommodating sliding receipt with two opposed parallel edges of said capacitor so as to retain said one major external surface of said capacitor in immediate coplanar adjacency to said underside of said major surface.

11. The photographic camera of claim 10 wherein said substantially planar means includes a generally planar interior wall member in fixed, spaced apart, generally parallel relation with respect to said housing member, said interior wall member including two substantially parallel recessed channels complementary to said tracks, said recessed channels being operative to engagingly receive those portions of said tracks which extend outward of said other major wall surface of said capacitor to accommodate the disposition of said non-recessed portion of said interior wall member in immediate coplanar adjacency to said other major external surface of said capacitor.

12. The photographic camera of claim 10 wherein said tracks are defined respectively by elongated flange portions extending outwardly from opposed parallel sides of said wall section, each of said flange portions being folded once longitudinally along the edge of said wall section so as to extend generally perpendicular to said major surface of said wall section with the outward portion of each flange being folded longitudinally again so as to extend inward in spaced apart overlapping relation with respect to said major surface of said wall section.

13. The photographic camera of claim 12 wherein said substantially planar means includes a generally planar interior wall member in fixed, spaced apart, generally parallel relation with respect to said housing section, said interior wall member including two substantially parallel recessed channels complementary to said outward overlapping portions of said flanges, said recessed channels being operative to engagingly receive said outward overlapping portions of said flanges to accommodate the disposition of said non-recessed portion of said interior wall member in immediate coplanar adjacency to said other major external wall surface of said capacitor.

14. The photographic camera of claim 9 wherein said wall section defines a generally rectangular underlying major surface and said means for removably connecting said mounting member with other structure of said camera includes a lip extending outward from one side of said wall section for longitudinal engagement with one underlying edge of said housing member opening to accommodate pivoting of said retaining plate about said underlying edge of said housing member opening, said means for removably connecting said mounting member with other structure of said camera also including a releasable latch portion adjacent the other side of said major surface of said wall section opposite from said lip for cooperating with said other structure of said camera to accommodate the latching of said capacitor mounting member to said housing member when said capacitor mounting member is pivoted into generally coplanar relation with said housing member.

15. The photographic apparatus of claim 14 wherein said releasable latch portion includes an elongated flange extending outwardly from said other side of said major surface of said wall section opposite from said lip, said elongated flange being cut along a portion of the length thereof which cut is in general spaced apart parallel relation to the longitudinal edge of said flange with the extreme ends of said cut being spaced inward respectively from the ends of said flange, said flange portion between said cut and outside longitudinal edge being resiliently deflectable in a direction substantially parallel to said major surface of said wall section and wherein said other structure of said camera for cooperating with said latch portion includes at least one dog ear extending laterally outward from an edge of said housing member opening to overlap and engage said resiliently deflectable portion of said flange when said capacitor mounting member is pivoted into generally coplanar relation with said housing wall member.

16. The photographic camera of claim 15 wherein said lip and deflectable flange portion are both recessed with respect to said major surface of said wall section.

17. The photographic camera of claim 9 wherein said camera includes a lighttight bellows having an opening in substantial registration with respect to said housing member opening, said bellows opening being defined by an upstanding peripheral ridge with the area immediately adjacent said peripheral ridge being sandwiched between said housing member and said planar means.

18. A photographic camera including an objective lens and adapted for use with an electronic flash tube, said camera comprising:
 a substantially thin flat capacitor for selectively energizing the flash tube;
 means for defining a focal plane;
 a wall structure including a substantially planar surface dimensioned to accommodate in face to face adjacency therewith one major external surface of said capacitor;
 a mirror;
 a member configured to retain said mirror;
 means for connecting said mirror retaining member to said wall structure and over said capacitor, said camera being structured so that said mirror is disposed in optical alignment with the objective lens to redirect image carrying light rays entering said camera through said objective lens onto said film plane, said mirror retaining member having a planar rear face section configured to be disposed in substantially immediate face to face adjacency with at least a major portion of the other major exterior surface of said capacitor to cooperate with said planar surface of said wall structure to restrain any widthwise expansion of said capacitor tending to occur during extended usage of said capacitor without initially imposing any compressive forces on said capacitor tending to alter the electrical characteristics of said capacitor.

19. The camera of claim 18 wherein said planar surface of said wall structure is recessed with respect to the edge portions of said wall structure.

20. The camera of claim 18 including a lighttight bellows having an opening therethrough in which is disposed said flat capacitor, said bellows opening being defined by an upstanding peripheral ridge with the area immediately adjacent said peripheral ridge being sandwiched between said wall structure and said mirror retaining member.

21. The camera of claim 18 wherein said means for connecting said mirror include a plurality of spaced apart, resilient C type clips disposed about the periphery of said retaining member.

* * * * *